(12) United States Patent
Fernandez

(10) Patent No.: US 8,384,563 B2
(45) Date of Patent: Feb. 26, 2013

(54) DEVICE FOR CONFIRMING THE ENGINE THRUST OF AN AIRCRAFT

(75) Inventor: Brice Fernandez, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 340 days.

(21) Appl. No.: 12/790,032

(22) Filed: May 28, 2010

(65) Prior Publication Data

US 2010/0302073 A1 Dec. 2, 2010

(30) Foreign Application Priority Data

Jun. 2, 2009 (FR) ...................... 09 02630

(51) Int. Cl.
*G08B 21/00* (2006.01)

(52) U.S. Cl. ........ 340/959; 340/963; 340/966; 340/969; 340/945; 340/971; 340/973; 701/3; 701/14; 701/15; 701/19; 701/99

(58) Field of Classification Search .................. 340/959, 340/963, 966, 969, 945, 971, 973; 701/3, 701/14, 15, 29, 33, 99
See application file for complete search history.

(56) References Cited

U.S. PATENT DOCUMENTS

| | | | | |
|---|---|---|---|---|
| 4,121,194 | A * | 10/1978 | Downey et al. ............... | 340/959 |
| 6,118,385 | A * | 9/2000 | Leard et al. ................... | 340/688 |
| 6,697,718 | B2 * | 2/2004 | Le Draoullec et al. ...... | 701/31.6 |
| 7,148,814 | B2 * | 12/2006 | Sikora et al. .................. | 340/945 |
| 7,321,318 | B2 * | 1/2008 | Crane et al. ................... | 340/971 |
| 2002/0072831 | A1 | 6/2002 | Blondel et al. | |
| 2006/0220914 | A1 | 10/2006 | Sikora et al. | |

FOREIGN PATENT DOCUMENTS

GB 1578535 11/1980

* cited by examiner

*Primary Examiner* — Tai T Nguyen

(74) *Attorney, Agent, or Firm* — Novak Druce Connolly Bove + Quigg LLP

(57) ABSTRACT

A device for confirming the engine thrust of an aircraft is disclosed. The device, via an operating logic unit (14) of each engine processing different information, including a warning indicator (15) connected to the unit (14) delivers or not thrust confirmation information at the level of the cockpit.

8 Claims, 2 Drawing Sheets

DEVICE FOR CONFIRMING THE ENGINE THRUST OF AN AIRCRAFT

CROSS-REFERENCE TO RELATED APPLICATIONS

This application claims priority to French Patent Application 0902630, filed Jun. 2, 2009, the contents of which are incorporated herein by reference.

FIELD OF THE INVENTION

The present invention relates to a device for confirming the thrust of the engines of an aircraft upon running on the ground during the take-off phase.

BACKGROUND OF THE INVENTION

It is known that, on airliners for instance, a display screen of the cockpit permanently displays on dials respectively associated with the engines, at least one primary control parameter relating to the thrust thereof, allowing the pilot and the co-pilot to check the thrust being delivered by the engines during all the flight phases of the airplane. Such a parameter indicated on each dial of the display screen can correspond to the rotation speed N1 of the engine in revolutions per minute or in percentage with respect to a maximal speed, or to the pressure ratio of the engine EPR or even to the current thrust expressed in percentage with respect to the THR or TPR available maximal thrust.

Whatever the display type, the availability of the full thrust upon the take-off phase or a reduced thrust for desired take-offs (Flex or Derated mode) on all the engines is crucial, so that checking the thrust thereof is provided by a specific procedure and should be positively notified by the pilot. If the take-off thrust is not available when running on the ground during the take-off phase before the airplane reaches its decision velocity V1, the take-off should be imperatively disrupted.

If the thrust of the engines is inappropriately checked, this could result in major consequences on the take-off safety (too short a runway in case of the take-off being disrupted, too low velocity, obstacle avoidance ... ).

Currently, upon the take-off phase, checking the thrust of the engines occurs through looking at the primary parameters being displayed on the display screen. Thus, for the take-off to be pursued, each engine should have reached its take-off thrust, i.e., either a maximum thrust or a lower thrust, but consistent with that programmed by the pilot in the case of a derated take-off.

Such check thus requires looking at the display screen and all the displayed parameters to <<be scanned>> so as to identify any <<abnormal>> parameter (on one or more engines). However, it could happen that the take-off occurs with thrusts that have not reached the desired (maximum or reduced) take-off thrust or with one or more engines not having reached the desired speed.

SUMMARY OF THE INVENTION

The present invention aims at overcoming such drawbacks and relates to a device for confirming the thrust of the engines of an aircraft upon the take-off phase on the ground, allowing to ensure, in a safe and reliable way, that the desired thrust of all the engines is reached and available.

To this end, the device for confirming the thrust of the engines of an aircraft while it is running on the ground, during the take-off phase thereof, the latter comprising, in the cockpit, at least one display screen permanently displaying at least one control parameter of each engine allowing to check the thrust of each one of them, is remarkable in that, according to the invention, it comprises:

an operating logic unit for each engine, receiving at least information on said control parameter of said engine when said thrust is reached, on the take-off mode position of the throttle lever corresponding to said engine and on the ground position of said aircraft; and a warning indicator connected at the outlet of said logic unit and able to display, at the level of said cockpit, thrust confirmation information when said information received by said logic unit is validated.

Thus, through this invention, the pilot (and the co-pilot) is made aware via the indicator that the thrust parameter(s) of the engine(s) is or are reached and that he can quite safely proceed with the take-off phase. Such an indication represents a help to the pilot for identifying, in a simple way, whether the thrust is sufficient for ensuring a perfectly safe take-off.

For instance, said logic unit comprises, for each engine, at least an AND gate advantageously receiving, at the respective inlets thereof, said information on the control parameter of said engine, on the take-off mode position of said throttle lever, and on the ground position of said aircraft, and, when said information is gathered and validated, delivers, at the outlet thereof, said thrust confirmation information in the direction of said warning indicator.

Preferably, said control parameter of said engine relates to at least one of those relating to the rotation speed of the engine, to the pressure ratio of said engine or to the thrust ratio of said engine with respect to the maximum thrust thereof.

Obviously, the warning indicator remains inactive if some information, opposite to those necessary for the thrust confirmation, is validated. For this, said logic unit comprises, for each engine:

an OR gate receiving at the respective inlets thereof at least information on the lack of thrust by said engine, on a position of the throttle lever other than that relating to the take-off mode, on a flight position of the aircraft and on a velocity of the aircraft higher than the take-off decision velocity; and a toggle at the inlets of which there are received said outlet information delivered by said AND gate and said outlet information delivered by said OR gate, and the outlet of which is connected to said warning indicator.

Thus, if one of the information associated to the OR gate is validated, the take-off procedure is cancelled, even if, furthermore, the information associated to the AND gate is validated, because the position of the toggle connected to the OR gate has priority. The take-off can only proceed when the AND gate information is validated and that entering the OR gate is invalidated.

Furthermore, after said thrust confirmation information has been displayed, a piece of information can be addressed to said warning indicator so as to cancel the display of said confirmation information.

Advantageously, said warning indicator is integrated into said display screen, so that the pilot is immediately warned about the thrust confirmation information of the engines as he looks up the control parameters (N1, THR ... ) of the latter at the time of the take-off phase.

Preferably, said warning indicator displays a light message. The latter could also be a sound.

In a first embodiment, an individual warning indicator is associated with each engine.

In a second embodiment, a common warning indicator is associated with all of said engines.

In such a case, said thrust confirmation information coming out of said logic units is sent to an AND gate, the outlet of which delivers said common overall confirmation information to all the engines in the direction of said common warning indicator.

Furthermore, after said thrust confirmation information has been displayed, a piece of information can be addressed to said warning indicator so as to cancel the display of said thrust confirmation information.

BRIEF DESCRIPTION OF THE DRAWINGS

The figures of the appended drawing will better explain how this invention can be implemented. In these figures like reference numerals relate to like components.

DETAILED DESCRIPTION

Figure 1:
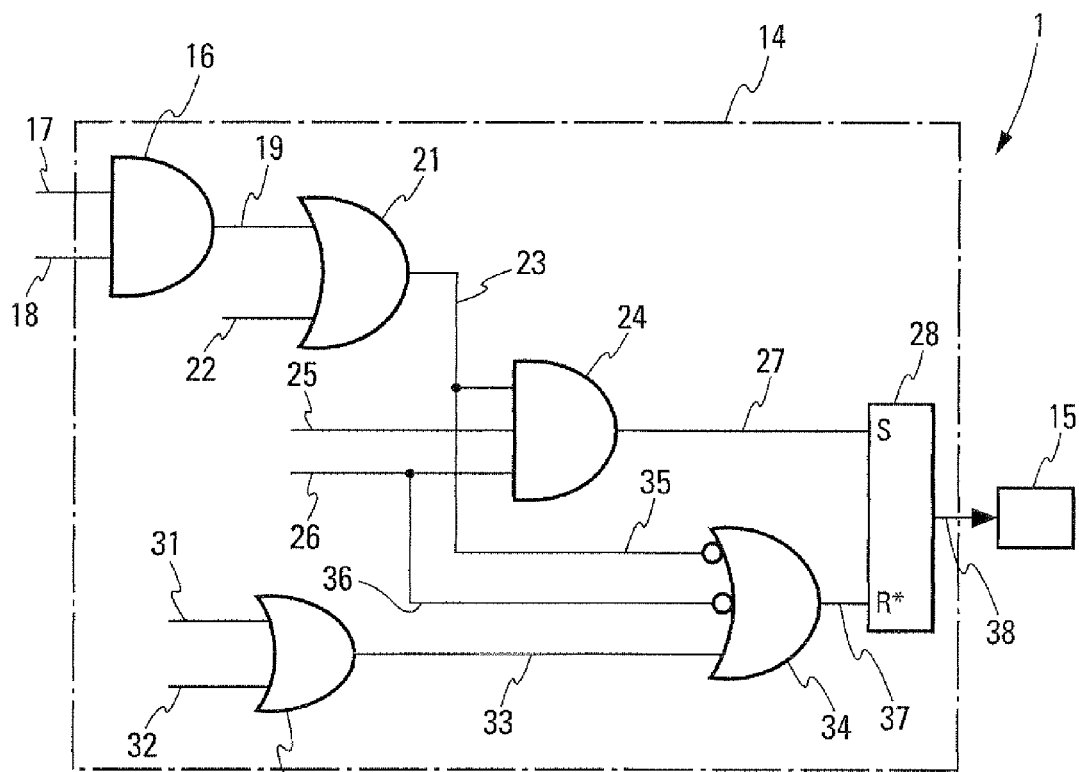
FIGS. 1 and 2 illustrate a first embodiment of the device according to the invention respectively showing the operating logic unit and the display screen of the control parameters of the engines with a warning indicator associated with each engine.

In the illustrated embodiments, the aircraft is an airliner of the twin-engine type, provided with the thrust confirmation device 1 for both engines (turbojets or others), according to this invention. Naturally, the airplane could have three, four, etc. engines or even be a one-engine airplane, and comprise the thrust confirmation device.

In the present case of a twin-engine airplane, the cockpit of the airplane comprises, as known, a display screen 2 indicating the operating state of the engines from, more specifically, control parameters such as THR, N1 and EGT.

The THR parameter relates to the current actual thrust of the engines expressed in percentage with respect to the maximum available thrust and is, analogically, indicated by two graduated circular dials 3, 4 with needles respectively dedicated to the left and right engines, and digitally, in the form of a digital display indicator 5, 6.

The parameter N1 relates to the speed of the engine expressed in this case in percentage compared to the maximal speed and is digitally indicated in respective indicators 7, 8 under the THR dials 3 and 4. N1 could also be expressed in revolutions per minute.

The parameter EGR relates, as far as it is concerned, to the temperature of the exhaust gases of the engines expressed in C.° and is indicated, as for THR, analogically by graduated circular dials 10, 11 with needle and digitally, by digital display indicators 12, 13.

The thrust confirmation device 1 comprises an operating logic unit 14 shown on FIG. 1 and a warning indicator 15 connected at the outlet of the logic unit and advantageously arranged in the display screen 2 for the above parameters.

The warning indicator 15 has an alphanumerical display and, when the logic unit 14 delivers information or a thrust confirmation signal as will be seen later on, it displays a light visual message in the form of the word SET for instance, warning the pilot that the programmed thrust desired for the engines is reached and available. The visual message can be continuous or intermittent and could be replaced or supplemented by a sound message.

In order to obtain such outlet information, the logic unit 14 comprises a number of logic gates receiving different information (parameters or other). Thus, a first AND logic gate 16 receives, at the first inlet thereof, via a link 17, a piece of information relative to the operation of the press button, not shown, acting on the parameter of the engine N1, and, at the second inlet thereof, via a link 18, a piece of information relative to the following condition: the current actual speed N1 is higher than a requested speed N1 entered by the pilot for the subject take-off less a predetermined tolerance threshold or margin. When both pieces of information are gathered, the AND gate 16 delivers at the outlet thereof, via a link 19, a positive piece of information corresponding to the validation of both previous pieces of information and being sent to a first inlet of a first OR gate 21 receiving at the second inlet thereof, via a link 22, a piece of information relating to the following condition: the power ratio of the TPR engine, such as, for instance THR, is higher than a requested power ratio, entered by the pilot less a predetermined tolerance margin.

When one or the other of the two pieces of information entered in the OR gate 21 is validated (depending on whether the pilot uses the parameter N1 or THR), it delivers at the outlet thereof, via a link 23, a positive piece of information being sent to a first inlet of a second AND gate 24. The latter also receives at a second inlet, via a link 25, a piece of information relating to the presence of the airplane on the ground and at a third inlet, via a link 26, a piece of information relating to the position of the throttle lever of the corresponding engine in the take-off position, either with a maximum thrust or a reduced thrust according to the mode selected by the pilot depending, more specifically, on the airplane load. On the display screen 2, the pilot has for instance displayed the FLEX take-off mode with 75% of thrust being requested.

If the three pieces of information entering the second AND gate 24 are gathered, it delivers, at the outlet thereof, via a link 27, a positive piece of information being then addressed to the warning indicator 15 displaying the indication SET.

Figure 2:
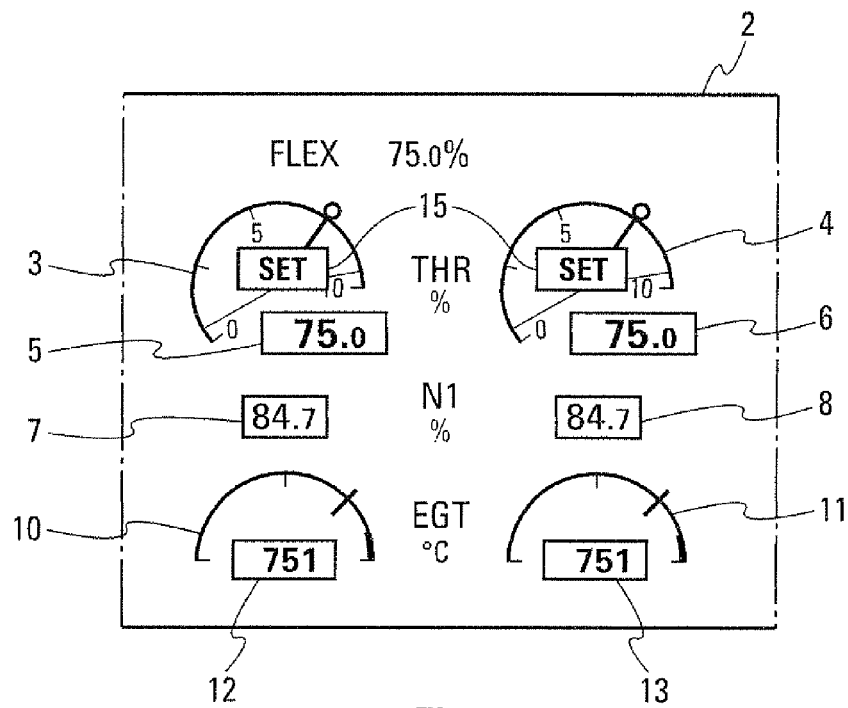

From FIG. 2 it can be seen that a warning indicator 15 is arranged in the needle dial N1 3, 4 of each engine, so that the SET light messages are immediately noticed by the pilot and the co-pilot.

However, for safety reasons, on the link 27 between the outlet of the second AND gate 24 and the corresponding warning indicator 15, there is arranged a toggle 28 taking into consideration other information for validating (or invalidating) that delivered by the AND gate 24, i.e. the thrust confirmation of the engines upon the airplane running on the ground during the take-off phase.

Thus, in the logic unit 14, a second OR gate 30 can be added, which receives at the two inlets thereof, via two corresponding links 31 and 32, respectively information relating to the fact that the airplane is in flight and that the velocity of the airplane is higher than a determined velocity such as, for instance, the decision velocity at the time of the take-off phase. When one of its two pieces of information is obtained, the OR gate 30 then delivers at the outlet thereof, via a link 33, a positive piece of information to a first inlet of a third OR gate 34. The latter also receives, via respective links 35 and 36 issued from links 23 and 26 relating to the thrust information TPR or the engine speed N1 information, on the one hand, and of the take-off mode position of the throttle lever of each engine, on the other hand, information contrary to those leading to second and third inlets of the OR gate 34. When one of such information is validated (airplane in flight, airplane velocity higher than the determined velocity, TPR or N1 not reached or throttle lever not in the take-off position), it delivers at the outlet thereof, via a link 37, a positive piece of information putting the toggle lever 28 in the position R* invalidating the position S (obtained when the three pieces of information TPR or N1, airplane on the ground and position of the throttle lever in take-off mode are gathered). The warning indicator does not switch on. The position R* of the toggle has further priority over the position S.

In the example as shown on FIG. 2, the thrust THR being displayed in the analogical screens 3 and 4 and the digital indicators 5 and 6 indicate 75% (the speed N1 of the engines being then at 84.7% on the indicators 7 and 8), corresponds to that programmed by the pilot in the FLEX take-off mode. The thrust of both engines is thus reached, the airplane being on the runway and the throttle lever of the engines being in the take-off position. Thereby, the AND gate 24 delivers via the link 27 a positive piece of information (the OR gate 34 delivering no information) to the toggle 28 being in a position S. The latter delivers in turn to the outlet thereof via a link 38 a positive piece of information to the warning indicator displaying the SET message. When SET is displayed on the different dials 3, 4 of the engines, the pilot knows for sure that the thrust issued from the engines is sufficient for proceeding with the take-off phase and for ensuring the latter.

Such an indication is a help to the pilot.

Figure 3:
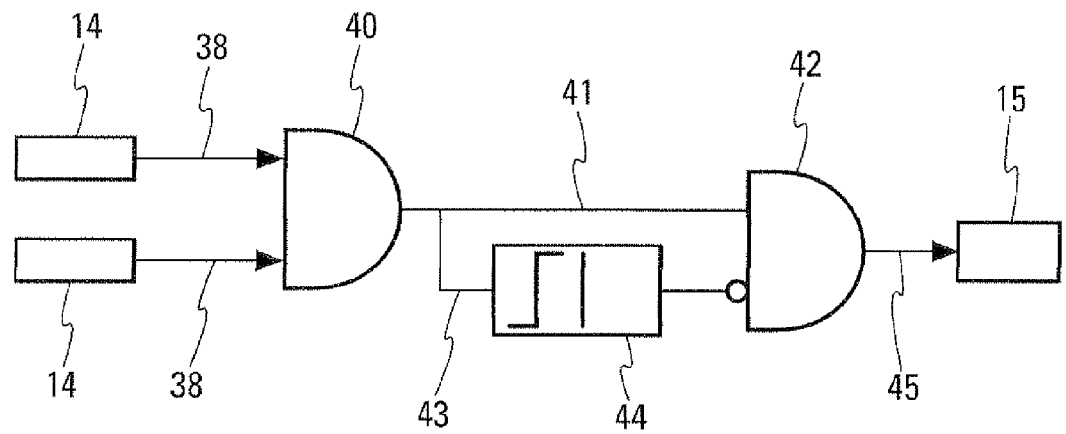
FIGS. 3 and 4 illustrate a second embodiment of the device respectively showing partially the logic unit and the display screen with a single warning indicator associated with all the engines.
Figure 4:
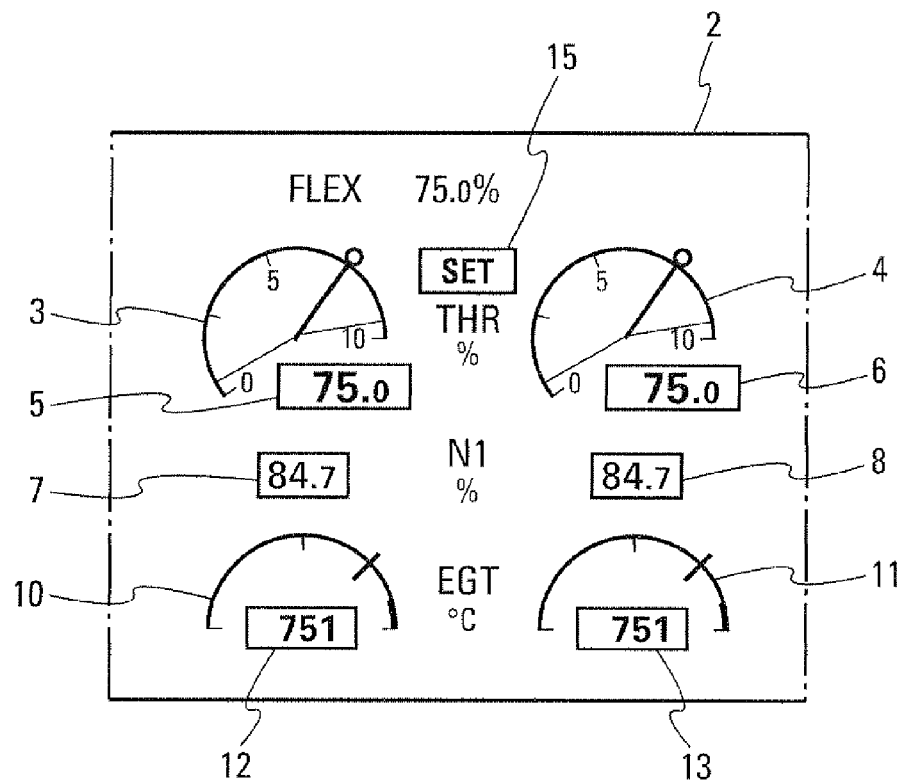

In the second exemplary embodiment, the warning indicator 15 is common to all the engines of the airplane and, in the present case, it is arranged in the centre of the display screen 2, between the two dials THR 3 and 4 above the THR acronym, as shown on FIG. 4. For obtaining such information common to the engines, the operating logic units 14 of both engines are connected, at the outlet of their toggles 28, to the inlets of an AND gate 40 via respective links 38, as shown on FIG. 3.

When the information entering the AND gate 40 is validated (engine thrust being obtained, for instance, requested 75% of the thrust in the FLEX mode are reached), it delivers at the outlet thereof, via a link 41, a positive piece of information in the direction of the warning indicator 15 displaying the SET message.

Other information could be contemplated to be taken into consideration, for instance, having the SET indication disappear after it has been validated. To this end, on the link 41, an AND gate 42 could be added receiving, in addition to the information coming out of the gate 40, information being issued from a by-pass 43 at the link 41 and taking into account, by means of a specific logic circuit 44 provided on the by-pass, switching to the state from 0 to 1 of said information coming out of the gate 40 and this, for a confirmation time of a few seconds.

Thus, beyond such a confirmation time, necessary for allowing the pilot to look at the information, the SET display will disappear from the warning indicator 15. The outlet of the AND gate 42 is obviously connected, via a link 45, to said indicator.

Other information could be further contemplated in order to disrupt the indication display, for instance, the indication could disappear:
  either beyond a determined airplane velocity (for instance after the decision velocity);
  or when the airplane has completed take-off (switch to the climbing phase for instance);
  or if take-off is disrupted;
  or if one of the engines has been submitted to some (partial or total) thrust loss.

The invention claimed is:

1. A device for confirming a thrust of at least one engine of an aircraft while it is running on a ground surface, upon a take-off phase thereof, such a device comprising:
  at least one display screen (2) in a cockpit of the aircraft permanently displaying at least one control parameter of each engine allowing to check the thrust delivered by one of them;
  an operating logic unit (14) for each engine, receiving at least information on said control parameter of said engine when said thrust is reached, on the take-off mode position of a throttle lever corresponding to said engine and on a ground position of said aircraft; and
  a warning indicator connected at an outlet of said logic unit and able to display, at a level of said cockpit, thrust confirmation information when said information received by said logic unit is validated,
wherein said logic unit (14) comprises, for each engine, at least an AND gate (24) receiving, at respective inlets thereof, said information on the control parameter of said engine, on the take-off mode position of said throttle lever, and on the ground position of said aircraft, and, when said information is gathered and validated, delivers, at the outlet thereof, said thrust confirmation information in a direction of said warning indicator (15), and
wherein said logic unit (14) further comprises, for each engine:
  an OR gate (34) receiving at the respective inlets thereof at least information on a lack of thrust by said engine, on a position of the throttle lever other than that relating to the take-off mode, on a flight position of the aircraft and on a velocity of the aircraft higher than a take-off decision velocity; and
  a toggle (28) at the inlets of which there are received said outlet information delivered by said AND gate (24) and said outlet information delivered by said OR gate (34), and the outlet of which is connected to said warning indicator (15).

2. A device according to claim 1, wherein said control parameter of said engine relates to at least one of those relating to a rotation speed of the engine, to a pressure ratio of said engine or to the thrust ratio of said engine with respect to a maximum thrust thereof.

3. A device according to claim 1, wherein said warning indicator (15) is integrated into said display screen (2).

4. A device according to claim 1, wherein said warning indicator (15) displays a light message.

5. A device according to claim 1, wherein an individual warning indicator (15) is associated with each engine.

6. A device according to claim 1, wherein a common warning indicator (15) is associated with all of said engines.

7. A device according to claim 6, wherein said thrust confirmation information coming out of said logic units (14) is sent to an AND gate (40), the outlet of which delivers said common overall confirmation information to all the engines in the direction of said common warning indicator.

8. A device according to claim 1, wherein, after said confirmation information has been displayed, a piece of information is addressed to said warning indicator (15) for cancelling the display of said thrust confirmation information.

* * * * *